(12) United States Patent
Park

(10) Patent No.: US 12,425,747 B2
(45) Date of Patent: Sep. 23, 2025

(54) CAR UNDERBODY INSPECTION ROBOT, AND PERFORMANCE INSPECTION SYSTEM USING THE SAME

(71) Applicant: OCMOBILE CO., LTD., Seoul (KR)

(72) Inventor: Jun Young Park, Seoul (KR)

(73) Assignee: OCMOBILE CO., LTD., Seoul (KR)

( * ) Notice: Subject to any disclaimer, the term of this patent is extended or adjusted under 35 U.S.C. 154(b) by 23 days.

(21) Appl. No.: 18/569,603

(22) PCT Filed: Jun. 10, 2022

(86) PCT No.: PCT/KR2022/008249
§ 371 (c)(1),
(2) Date: Dec. 13, 2023

(87) PCT Pub. No.: WO2022/270803
PCT Pub. Date: Dec. 29, 2022

(65) Prior Publication Data
US 2024/0267638 A1    Aug. 8, 2024

(30) Foreign Application Priority Data
Jun. 24, 2021  (KR) .......................... 10-2021-0082737

(51) Int. Cl.
*H04N 23/90* (2023.01)
*H04N 23/66* (2023.01)

(52) U.S. Cl.
CPC ............. *H04N 23/90* (2023.01); *H04N 23/66* (2023.01)

(58) Field of Classification Search
CPC ........ H04N 23/66; H04N 23/90; G01N 21/88; G01N 21/93; G01N 21/95; B25J 19/02; B25J 5/00; B25J 9/10
See application file for complete search history.

(56) References Cited

U.S. PATENT DOCUMENTS

| | | | |
|---|---|---|---|
| 6,856,344 B2* | 2/2005 | Franz ................. | G01N 21/8806 348/143 |
| 9,648,256 B2* | 5/2017 | Ramsey ................. | H04N 23/20 |
| 10,497,108 B1* | 12/2019 | Knuffman ............... | G06N 20/00 |
| 11,077,558 B2* | 8/2021 | Ohm ........................ | B25J 19/02 |
| 11,145,043 B2* | 10/2021 | Myers .................. | H04N 23/661 |
| 11,461,890 B2* | 10/2022 | Megherby .............. | G06V 10/10 |
| 12,177,598 B2* | 12/2024 | Carolus ................ | H04N 5/2625 |

(Continued)

FOREIGN PATENT DOCUMENTS

| | | |
|---|---|---|
| CN | 101653937 A | 2/2010 |
| CN | 205539531 U | 8/2016 |

(Continued)

OTHER PUBLICATIONS

International Search Report mailed Sep. 28, 2022 for PCT/KR2022/008249.

*Primary Examiner* — Boubacar Abdou Tchoussou
(74) *Attorney, Agent, or Firm* — CANTOR COLBURN LLP

(57) ABSTRACT

The present invention relates to a car underbody inspection robot that is inserted under the car to inspect the underside of the car while driving. The car underbody inspection robot comprises a robot body, a driving camera, a plurality of underbody inspection cameras, a communication unit, and a control unit.

3 Claims, 10 Drawing Sheets

(56) References Cited

U.S. PATENT DOCUMENTS

| | | | | |
|---|---|---|---|---|
| 2006/0170768 A1* | 8/2006 | Riley | ............... | H04N 7/181 |
| | | | | 348/143 |
| 2007/0029117 A1* | 2/2007 | Goldenberg | ........... | B62D 55/10 |
| | | | | 180/9.5 |
| 2007/0040911 A1* | 2/2007 | Riley | ............... | H04N 7/181 |
| | | | | 348/E7.086 |
| 2016/0090132 A1* | 3/2016 | Ramsey | ............ | H04N 23/66 |
| | | | | 348/148 |
| 2022/0084325 A1* | 3/2022 | Crone | ............. | G06V 20/194 |

FOREIGN PATENT DOCUMENTS

| | | | |
|---|---|---|---|
| JP | 2016206141 | A | 12/2016 |
| JP | 2019528453 | A | 10/2019 |
| KR | 101745988 | B1 | 6/2017 |
| KR | 20180064206 | A | 6/2018 |

\* cited by examiner

CAR UNDERBODY INSPECTION ROBOT, AND PERFORMANCE INSPECTION SYSTEM USING THE SAME

TECHNICAL FIELD

This application claims priority based on Korean Patent Application No. 10-2021-0082737 filed on Jun. 24, 2021, and all content disclosed in the specification and drawings at the time of filing is fully incorporated into this specification.

The present invention relates to a car underbody inspection robot, performance inspection system and method using the same, and more particularly, to a car underbody inspection robot that is inserted under the car to inspect the underside of the car while driving, and a performance inspection system and method using the same.

BACKGROUND ART

In general, the condition of the underbody of a car can only be inspected when the car is delivered in a place where there is a work bay where people can enter and exit or where a lift for lifting the car is installed. When a car is delivered to such a facility, a person visually inspects the underside of the car to check the installation condition of parts, oil leakage, damage, corrosion, etc., and writes them down on a standard checklist.

The car performance inspection is performed to check whether the car can be driven normally, to check whether maintenance/repair is necessary, or to provide a certification for trading used cars.

However, in order to check the performance of a car, it is inconvenient to drive the car and deliver it to a car inspection station, which is an obstacle to the revitalization of used car transactions between individuals or online transactions. The car performance inspection is generally performed in a way that only determines whether there is oil leakage, parts fastening, or parts damage by the inspector's visual inspection.

If portable and intelligent inspection robots are introduced into these car performance inspection tasks and can make standardized data and provide it to consumers through online, an automated used car trading platform service suitable for the artificial intelligence era will become possible.

In this regard, Korean Patent Publication No. 10-1745988 discloses a car underbody photographing device. The car underbody photographing device comprises a main body having a flat top and bottom: a front camera provided on the front of the main body to photograph a predetermined range in the upward direction at a certain angle: a side camera provided on the left and right sides of the upper surface of the main body to photograph a predetermined range at a certain angle upward: a distance sensor provided on the front and rear of the upper surface, and left and right sides of the main body respectively: communication unit provided in the main body to communicate with the outside: a driving means provided on the left and right sides of the main body consisting of wheels or caterpillars to provide driving force for forward and backward movement; and a control unit provided in the main body to control the front camera, the side camera, the communication unit, and the driving means.

The communication unit transmits a video taken by the front camera and the side camera to a computer device, and the computer device stores the transmitted video and creates a panoramic photo showing an entire underbody of the car by merging the video taken by the side cameras, and the display device displays the video taken by the front camera and the panoramic photo created by the computer device. The computer device does not perform the panoramic photo creation task if there is a problem with the video transmitted by the car underbody photographing device, and transmits a command to re-photograph to a communication unit. When receiving a re-photography command through the communication unit, the car underbody photographing device causes the front camera and the side camera to perform re-photography under the control of the control unit. When the car moves forward, the driving means is driven according to the control of the control unit to proceed forward and re-photograph, and the car underbody photographing device proceeds across the middle of the lower part of the car by control using sensing information from the distance sensor.

However, conventional car underbody photographing devices using car-type robots, including those disclosed in Korean Patent Publication No. 10-1745988, have a disadvantage in that smooth imaging is difficult due to limitations in the angles that can be captured at one time. The limitations are caused by the cameras installed on a left and right side of upper surface of the main body to photograph the underbody of the car. These disadvantages become more noticeable when inspecting an underbody of a car having a relatively low height.

DISCLOSURE

Technical Goal

The present invention is devised in consideration of the above problems, and an object of the present invention is to provide a car underbody inspection robot, performance inspection system using the same, and method thereof that can easily inspect the underbody of various types of cars at any location by an automated inspection robot.

Another object of the present invention is to provide a car underbody inspection robot, performance inspection system using the same, and method thereof that can accurately photograph a tread surface of a tire in addition to photographing the underbody of the car.

Another object of the present invention is to provide a car underbody inspection robot, performance inspection system using the same, and method thereof that can collect sound data generated from various mechanical and electronic devices in the car while taking a video the underbody of the car.

Another object of the present invention is to provide a car underbody inspection robot, performance inspection system using the same, and method thereof that can inspect the performance of the car using a portable, intelligent car-type robot to provide inspection information through online in real time to activate online transactions, non-face-to-face transactions, and person-to-person transactions (P2P) of used cars.

Technical Solution

In order to achieve the above objects, the present invention includes a robot body having a traveling means provided with wheels or caterpillars and a drive motor that provides rotational force to the traveling means; a driving camera installed in a front of the robot body to take a video for a front: a plurality of underbody inspection cameras installed in the robot body to take videos or photos for an underbody of the car to be inspected: a communication unit installed in the robot body to communicate with an outside;

and a control unit installed in the robot body to control the operation of the driving camera, the underbody inspection cameras, the communication unit, and the driving motor. The control unit controls the driving motor to move and stop the robot body along a predetermined path. In addition, the control unit operates the plurality of underbody inspection cameras every time the car stops to photograph subject areas of the underbody of the car to be inspected so that they overlap with each other. And, after the control unit completes photographing all subject areas of the underbody of the car to be inspected, it processes the image data to automatically generate one matching image photo of the underbody of the car to be inspected, or sends the image data to an external device to generate the matching image photo at the external device. The plurality of underbody inspection cameras are arranged at predetermined intervals in the width direction of the robot body, and their number can be changed in accordance with a distance between the left and right wheels of the car to be inspected.

The robot body includes a master unit connected to a traveling means and a drive motor of one side with respect to a center of the robot body, a slave unit connected to a traveling means and a drive motor of the other side with respect to the center of the robot body, and an expansion unit selectively located between the master unit and the slave unit. And the inspection cameras are installed in each of the master unit, the slave unit, and the expansion unit, and the width of the robot body can be changed by a number of expansion units used.

Preferably, it may further include a tread inspection camera disposed on both sides of the robot body and selectively protruding to the side of the robot body to photograph a tread surface of the car to be inspected.

According to another aspect of the present invention, a car performance inspection system is provided. It includes a car underbody inspection robot that is inserted into the space below the car to be inspected and takes overlapping images of subject areas of the car; an inspection robot linked module that receives and processes image data photographed by the car underbody inspection robot to generate one matching image photo of the underbody of the car to be inspected; and a car performance evaluation module that performs performance evaluation based on the matching image generated by the inspection robot linked module and outputs an evaluation results so that they can be checked online.

The car underbody inspection robot is provided with a robot body having a traveling means provided with wheels or caterpillars and a drive motor that provides rotational force to the traveling means. And the robot body includes a master unit connected to a traveling means and a drive motor of one side with respect to a center of the robot body, a slave unit connected to a traveling means and a drive motor of the other side with respect to the center of the robot body, and an expansion unit that can be interposed between the master unit and the slave unit. And the inspection cameras are installed in each of master unit, the slave units, and the expansion units. The width of the robot body can be determined by the number of expansion units used.

According to another aspect of the present invention, a method for performance inspection is provided. It includes steps of, (a) inserting a car underbody inspection robot equipped with an underbody inspection camera into the lower space of the car to be inspected; (b) driving the car underbody inspection robot to repeatedly move and stop, and selectively operating the underbody inspection camera at each stop to photograph subject areas of the car to be inspected in an overlapping manner: (c) uploading image data photographed by the car underbody inspection robot to a car performance inspection management server; and (d) processing the image data in the car performance inspection management server to generate one matching image photo of the underbody of the car to be inspected.

The step (b) may further include a step of photographing a tread surface of the car to be inspected by selectively protruding a tread inspection camera from both sides of the robot body to a side of the robot body.

Advantageous Effects

Car underbody inspection robot, performance inspection system using the same, and method thereof according to the present invention have the following effects.

First, it is possible to inspect an underbody of a car by inserting a car underbody inspection robot without spatial constraints.

Second, by freely adjusting a width of the inspection robot in response to a width of a car being inspected, it is possible to inspect a performance of various types of cars, from small cars to large cars.

Third, an accuracy of tread inspection can be improved because a camera can be placed to directly face a tread surface of the car tire.

Fourth, along with car underbody inspection, sound data generated from a car's mechanical and electrical devices can be collected and reflected in generating an AI performance checklist.

BEST MODE

Hereinafter, preferred embodiments of the present invention will be described in detail with reference to the attached drawings.

Figure 1:
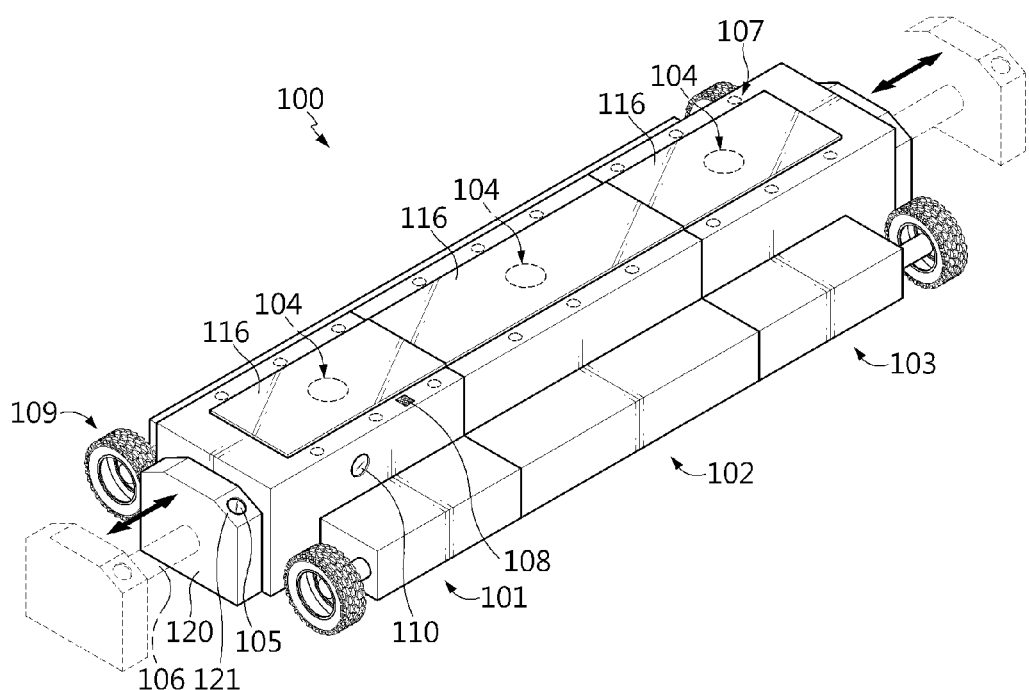
FIG. 1 is a perspective view showing a configuration of a car underbody inspection robot according to a preferred embodiment of the present invention.
Figure 2:
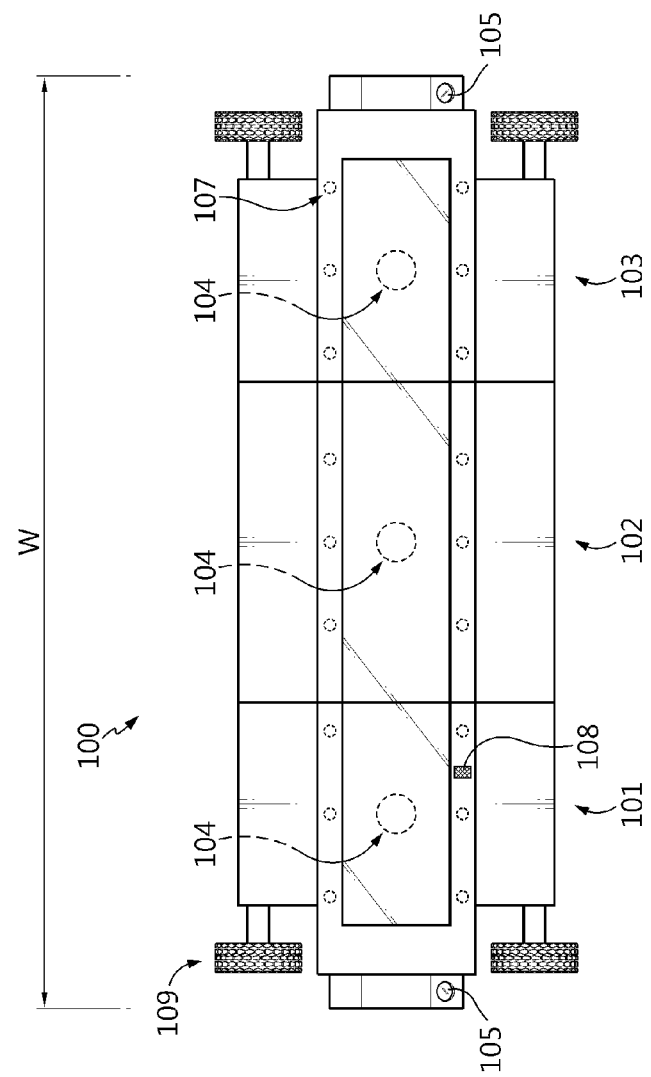
FIG. 2 is a plan view of FIG. 1.

FIG. 1 is a perspective view showing a configuration of a car underbody inspection robot according to a preferred embodiment of the present invention, FIG. 2 is a plan view of FIG. 1, and FIGS. 3 to 5 are plan views showing a modified embodiment of FIG. 2.

Referring to FIGS. 1 to 5, the car underbody inspection robot according to a preferred embodiment of the present invention includes a robot body 100, a driving camera 110 mounted on the robot body 100 to take videos or photos for a front, a plurality of underbody inspection cameras 104 installed in the robot body 100 to photograph the underbody of the car, and tread inspection cameras 105 installed at both ends in the width direction of a robot body 100 to photograph a tread surface of the car to be inspected. The plurality of underbody inspection cameras 104 are arranged at predetermined intervals in the width direction of the robot body 100, and their number can be changed in accordance with a distance between the left and right wheels of the car to be inspected.

The robot body 100 includes a traveling means 109 provided with wheels or caterpillars, and a drive motor (not shown) that provides rotational force to the traveling means 109. Specifically, the robot body 100 includes a master unit 101 connected to one side (left side) traveling means 109 and a drive motor, and a slave unit 103 connected to the other side (right side) traveling means 109 and a drive motor with respect to the center, and an expansion unit 102 selectively interposed between the master unit 101 and the slave unit 103. The units 101 to 103 may be connected to each other in series by, for example, a groove/protrusion assembly structure or a predetermined locking structure.

Figure 9:
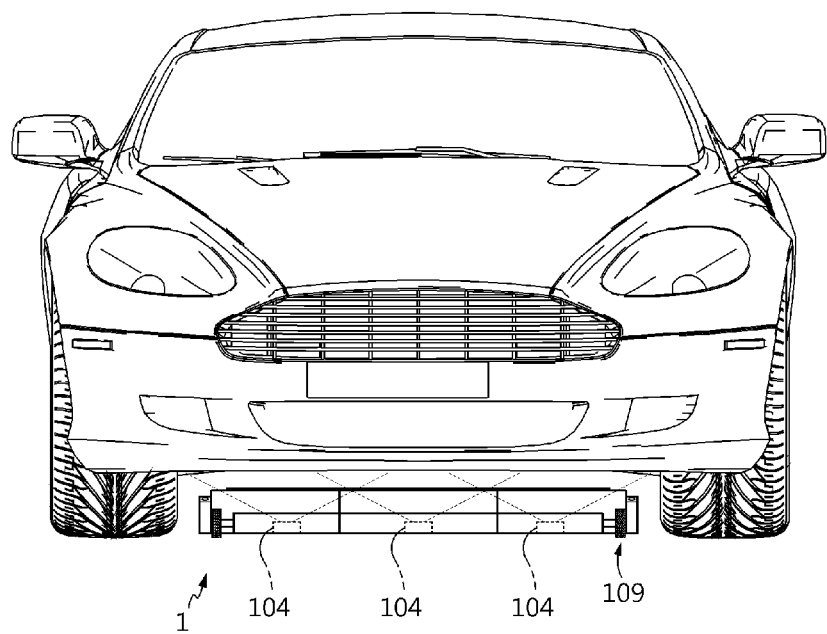
FIG. 9 is a front view showing an example of a car underbody inspection performed by a car underbody inspection robot according to the present invention.

As shown in FIG. 9, the robot body 100 must be placed in a space below the car and run freely, so the overall height of the robot body 100 is slim, about ten centimeters (cm).

The master unit 101 continuously communicates with the slave unit 103 and the expansion unit 102 to ensure normal driving. In addition, the master unit 101 performs a function of collecting image data collected by each underbody inspection camera 104 and transmitting them to an external device.

Figure 3:
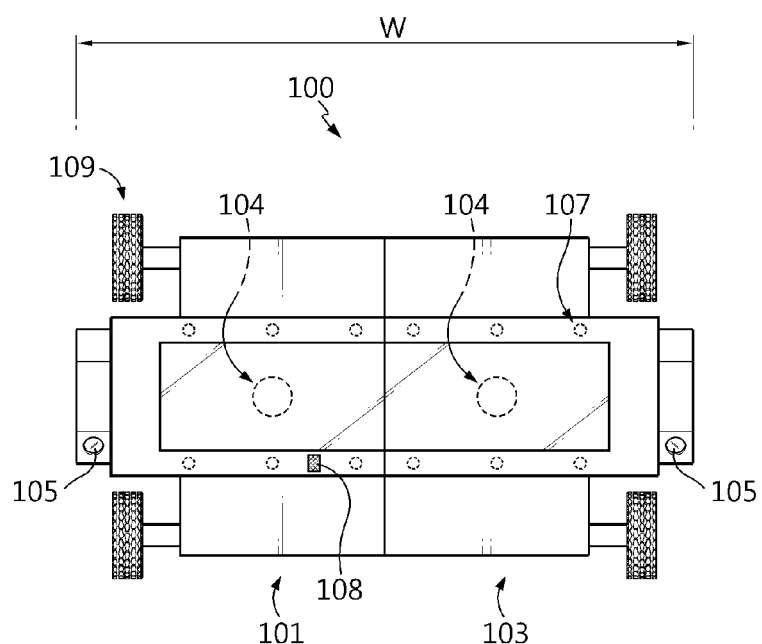
FIGS. 3 to 5 are plan views showing a modified embodiment of FIG. 2.

If a width (W) of the robot body 100 has to be set to a minimum, the expansion unit 102 is omitted and the master unit 101 and slave unit 103 can be directly connected to each other, as shown in FIG. 3.

Figure 4:
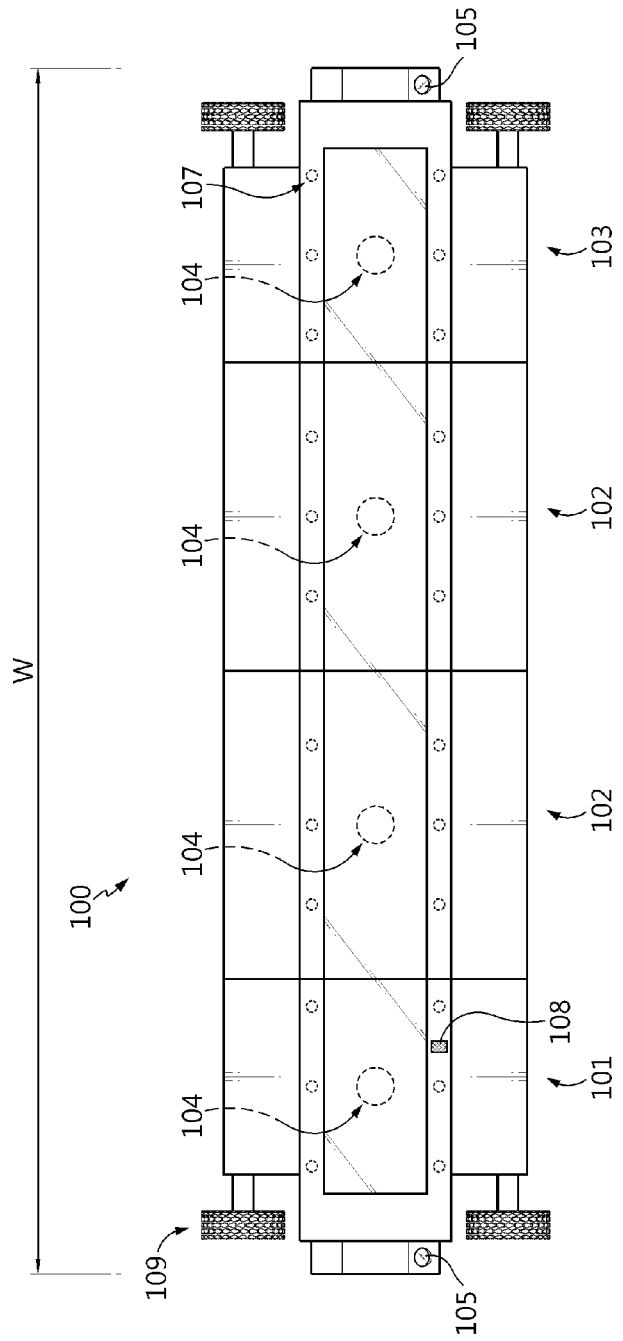

In addition, if it is necessary to further increase a width (W) of the robot body 100 in response to a distance between the left and right wheels of the car to be inspected, as shown in FIG. 4, the expansion unit 102 can be added as needed. As explained above, by changing the number of expansion units 102 used in this way, the width (W) of the robot body 100 can be optimized in response to the distance between the left and right wheels of the car to be inspected.

Figure 5:
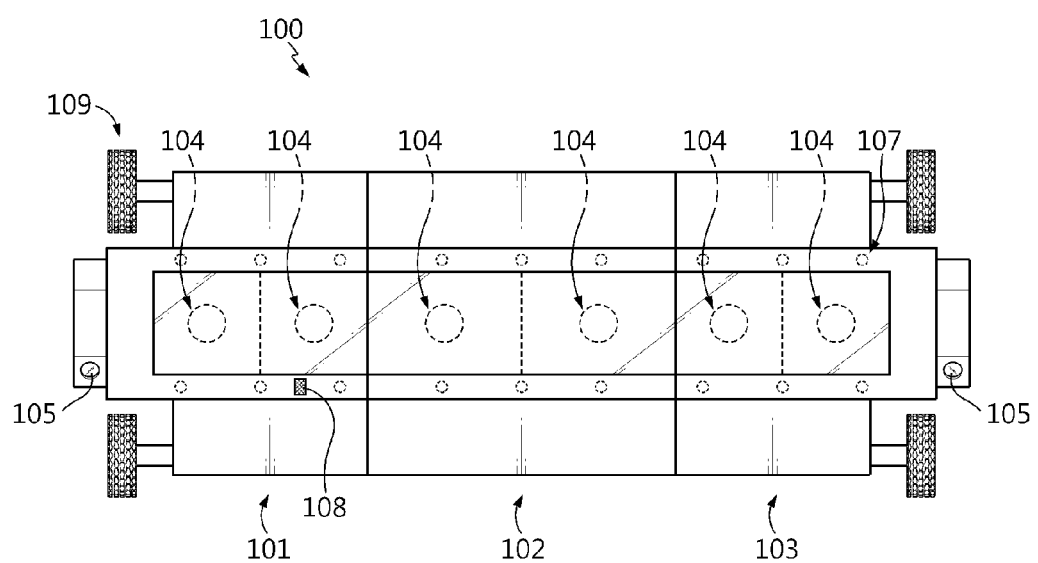

A plurality of underbody inspection cameras 104 are respectively disposed in the master unit 101, the slave unit 103, and the expansion unit 102, and are arranged at predetermined intervals in a width direction of the robot body 100. Alternatively, two or more underbody inspection cameras 104 may be disposed in each unit 101 to 103 respectively as shown in FIG. 5.

The driving camera 110 is installed in front of the master unit 101 of the robot body 100 and takes videos for a front image. Preferably, the images of the left and right wheels of the car to be inspected captured by the driving camera 110 can be used as a reference subject to enable the inspection robot under the car to drive steadily along the center point of the car to be inspected.

A plurality of underbody inspection cameras 104 are installed in each of the master unit 101, slave unit 103, and expansion unit 102. The underbody inspection camera 104 is arranged so that the lens faces upward to capture the lower part of the car. In order to protect the lens from foreign matters, etc., it is desirable to place a transparent plate 116 made of a material such as acrylic or tempered glass on the top of each unit. In order to maximize the distance from the bottom of the car, it is preferable that the underbody inspection cameras 104 are mounted on the floor in each unit 101 to 103.

Figure 10:
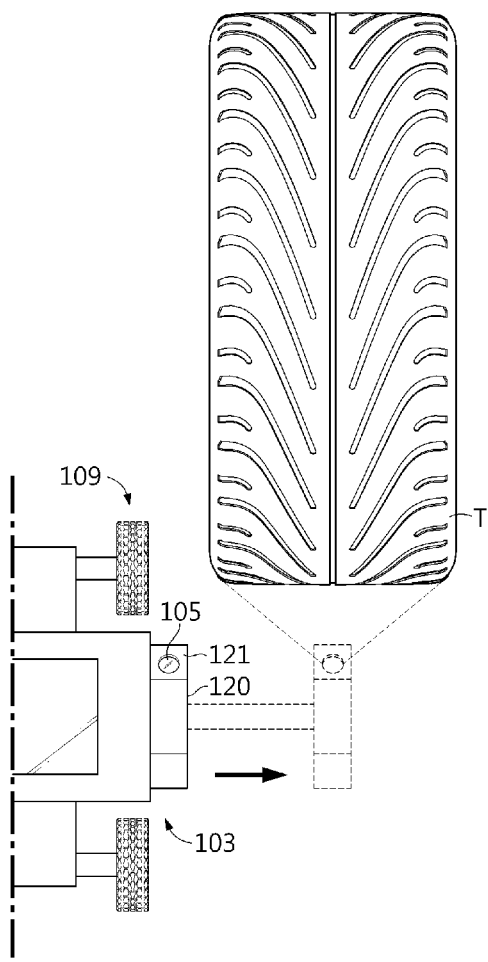
FIG. 10 is a plan view showing an example of a car tread inspection performed by a car underbody inspection robot according to the present invention.

The tread inspection camera 105 is disposed on both sides of the robot body 100 and can selectively slide linearly by a predetermined linear drive mechanism 106 to protrude to a side of the robot body 100. As shown in FIG. 10, the tread inspection camera 105 moves to the center of the tire T of the car to be inspected by extending a length of the linear drive mechanism 106 and precisely photographs the tread surface. Considering the height of the car underbody inspection robot and a curvature of a typical car tire T, the tread surface to be inspected is located in front and above the tread inspection camera 105, so it is efficient for the tread inspection camera 105 to be placed slantly upward with respect to the ground. For this purpose, a support block 120 is substantially rectangular or square block with an inclined surface 121 formed on at least one corner, and the tread inspection camera 105 is installed on the inclined surface 121. The support block 120 is fixed to the linear drive mechanism 106 and can move forward and backward. Accordingly, the tread inspection camera 105 can protrude to the side of the robot body 100 as the support block 120 advances. Here, the linear drive mechanism 106 may be composed of, for example, an assembly of a ball screw and a motor.

Figure 6:
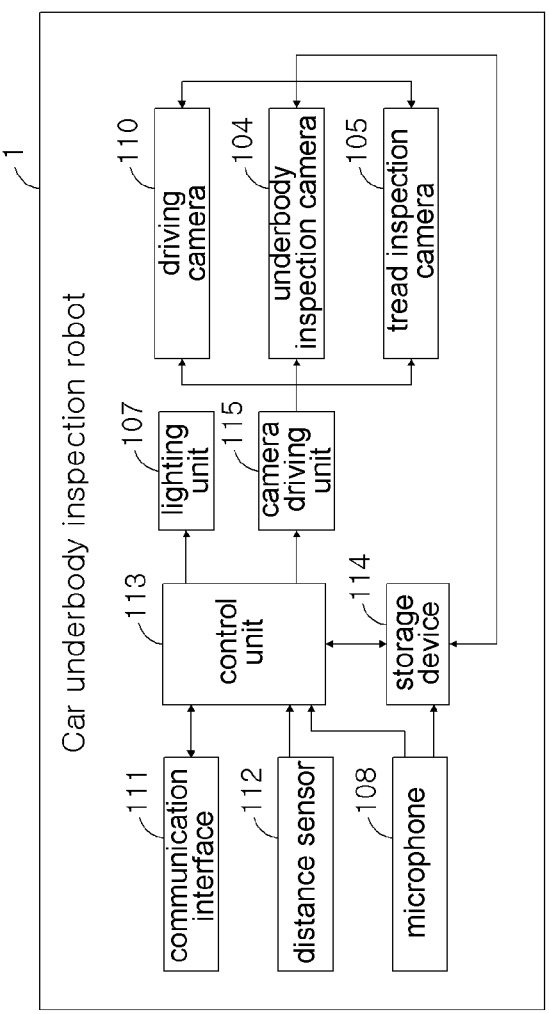
FIG. 6 is a block diagram showing functional configurations of a car underbody inspection robot according to a preferred embodiment of the present invention.

Referring to FIG. 6, the car underbody inspection robot 100 includes a communication interface 111 for transmitting and receiving data with the car performance inspection management server 200, and a distance sensor 112 including an ultrasonic sensor etc., for accurate driving of the car underbody inspection robot, a microphone 108 that collects sounds generated by mechanical/electrical devices when the car is operated, a control unit 113 in charge of overall control, and a storage device 114 that stores image data and sound data, a lighting unit 107 consisting of a plurality of power LED elements to provide lighting during shooting, a camera driving unit 115 that is responsible for electrical/mechanical operation of the cameras, and a battery pack for power (not shown).

The communication interface 111 is a communication unit installed in the robot body 100 to perform wired or wireless communication with an outside.

The control unit 113 is installed in the robot body 100 and controls operations of the driving camera 110, the underbody inspection camera 104, the tread inspection camera 105, the communication unit, and the driving motor. The control unit 113 controls the driving motor to move and stop the robot body along a predetermined path. In addition, the control unit 113 selectively operates the plurality of underbody inspection cameras every time the car stops to photograph subject areas of the underbody of the car to be inspected so that they overlap with each other. And, after the control unit completes photographing all subject areas of the underbody of the car to be inspected, the control unit 113 processes the image data to automatically generate one matching image photo of the underbody of the car to be inspected, or sends the image data to an external device to generate the matching image photo at the external device.

It is preferable that the plurality of power LEDs forming the lighting unit 107 are arranged at predetermined intervals along the upper edge of the robot body 100.

Figure 7:
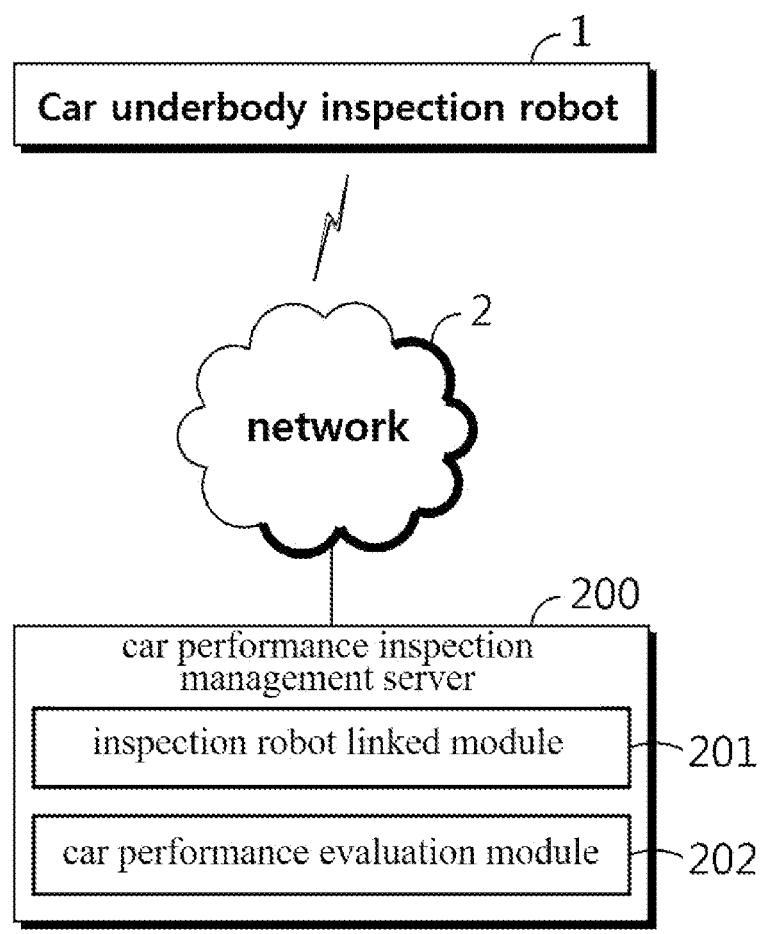
FIG. 7 is a block diagram showing configurations of a car performance inspection system according to a preferred embodiment of the present invention.
Figure 8:
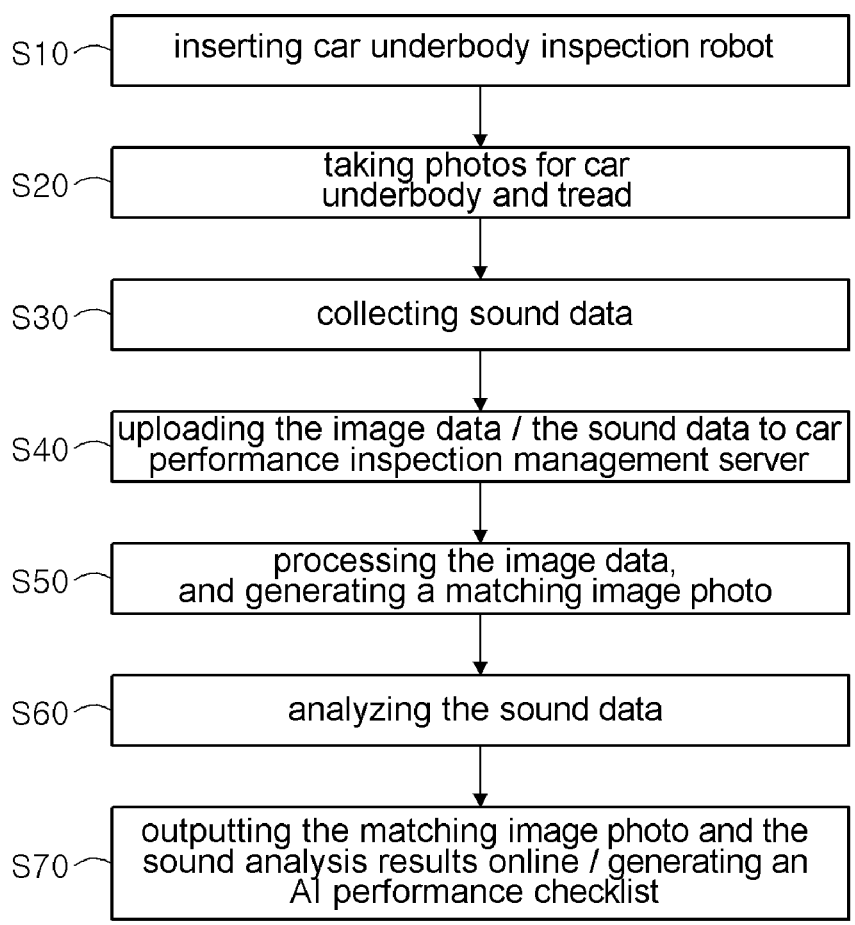
FIG. 8 is a flowchart showing a processing method of a car performance inspection system according to a preferred embodiment of the present invention.

FIG. 7 is a block diagram showing the configuration of a car performance inspection system according to a preferred embodiment of the present invention.

Referring to FIG. 7, the car performance inspection system according to a preferred embodiment of the present invention includes the car underbody inspection robot 1 described above, and a car performance inspection management server 200. The car underbody inspection robot 1 is inserted into a space beneath the car to be inspected and takes overlapping images of the subject areas of the underbody of the car. The car performance inspection management server 200 has an inspection robot linked module 201, and a car performance evaluation module 202. The inspection robot linked module 201 receives and processes image data captured by the car underbody inspection robot 1 to generate one matching image photo of the underbody of the car to be inspected. The car performance evaluation module 202 performs performance evaluation based on the registration image generated by the inspection robot linked module 201 and outputs the evaluation results so that they can be checked online. The car underbody inspection robot 1 and the car performance inspection management server 200 are connected to each other by a network 2 such as wired or wireless internet.

A processing method of the car performance inspection system having the above configuration includes a process (step S10) of inserting a car underbody inspection robot equipped with an inspection camera into the space under the car to be inspected, a process (step S20) of driving the car underbody inspection robot to repeatedly move and stop, and selectively operating the underbody inspection camera at each stop to photograph subject areas of the car to be inspected in an overlapping manner, a process (step S30) of collecting sound data generated from the car using a microphone 108 provided in the robot body 100, a process (step S40) of uploading the image data and the sound data acquired by the car underbody inspection robot to a car performance inspection management server 200, a process (step S50) of processing the image data by the car performance inspection management server 200 to connect each other to generate one matching image photo of the underbody of the car to be inspected, a process (step S60) of analyzing the sound data, and a process (step S70) of outputting the registration image photo and the sound analysis results online through a web server and generating an AI performance checklist along with a standard performance checklist prescribed by law.

In step S20, whenever the robot body 100 stops, the underbody inspection camera 104 is operated to photograph the subject areas of the underbody of the car to be inspected so as to overlap each other. And then, the tread inspection camera 105 can be selectively protruded laterally from both sides of the robot body 100 to photograph a tread surface of the car to be inspected. The image data obtained by photographing the tread surface is transmitted to the car performance inspection management server 200 and reflected in the tire wear evaluation.

In the process of analyzing sound data (step S60), abnormal signs of the car can be detected by mapping the sound data to error database for each car type which is memorized in a database already. If an abnormality is found in the sound data, an abnormality report is generated and reflected in the AI performance inspection results. If there are no abnormalities, a normal report can be generated and reflected in the AI performance inspection results.

The processing method of a car performance inspection system according to another embodiment of the present invention includes a process of searching detailed car model information through a license plate number of the car to be inspected, a process of calculating a size and a configuration of the robot (number of expansion units 102 to be used, etc.) based on specifications (car width, length, etc.) of the searched car, a process of calculating an area and an order to be measured according to the specifications of the searched car and the configuration of the car underbody inspection robot, a process of transmitting the configurations and the calculated inspection scenario of the underbody inspection robot to the car underbody inspection robot, a process of photographing the inspection and obtaining other sensed data during the forward movement of the car underbody inspection robot, a process of photographing the inspection and obtaining other sensed data during the backward movement of the car underbody inspection robot, a process of transmitting the data acquired by the car underbody inspection robot to the car performance inspection server to evaluate the data by the server, a process of online checking the data report evaluated by the server and the raw data.

As described above, the car underbody inspection robot, the car performance inspection system using the same, and method thereof according to the present invention can perform an inspection of the underbody of the car by inserting the car underbody inspection robot without spatial constraints, regardless of where the car to be inspected is located. In addition, there is an advantage of being able to inspect a performance of various types of cars, from small cars to large cars, by freely adjusting a width of the inspection robot in response to the body width of the car being inspected.

Although the present invention has been described above with limited examples and drawings, the present invention is not limited thereto, and various modifications and variations are possible within the scope of equivalence of the patent claims and the technical idea of the present invention by those skilled in the art to which the present invention pertains.

INDUSTRIAL APPLICABILITY

It is possible to conveniently inspect an underbody of a car by inserting an underbody inspection robot without spatial constraints. Therefore, it is possible to eliminate the spatial constraints of car performance inspection and an inconvenience of trading used cars, and further make an objective performance inspection report through automated and standardized analysis. In addition, in an era when autonomous car driving and a sharing/subscription economy are becoming more common, people can enjoy routine inspections during their daily driving process. The inspection results can be used as an objective indicator for business by reflecting in the car's depreciation, usage fees, and insurance premiums.

What is claimed is:
1. A car underbody inspection robot comprising;
a robot body including a traveling means having wheels or caterpillars, and a drive motor that provides rotational force to the traveling means;
a driving camera installed in a front of the robot body to take videos for a front view;
a plurality of underbody inspection cameras installed in the robot body to photograph an underbody of the car to be inspected;
a communication unit installed in the robot body to communicate with an outside; and
a control unit installed in the robot body to control an operation of the driving camera, the underbody inspection cameras, the communication unit, and the driving motor, wherein the control unit controls the driving motor to move and stop the robot body along a predetermined path, and the control unit operates the plurality of underbody inspection cameras each time the robot body stops to photograph subject areas of the underbody of the car to be inspected in an overlapping manner, wherein after photographing all subject areas of the underbody of the car to be inspected, the control unit processes image data to automatically generate one matching image photo of the underbody of the car to be inspected, or sends the image data to an external device to generate the matching image photo by the external device, wherein the plurality of underbody inspection cameras are arranged at predetermined intervals in a width direction of the robot body, and their number can be changed in accordance with a distance between left and right wheels of the car to be inspected, wherein the robot body comprises;

a master unit connected to the traveling means and the driving motor of one side with respect to a center of the robot body;

a slave unit connected to the traveling means and the drive motor of the other side with respect to the center of the robot body; and an expansion unit selectively located between the master unit and the slave unit, wherein the underbody inspection cameras are installed in each of the master unit, the slave unit, and the expansion unit, and a width of the robot body is changed depending on a number of expansion units used.

2. The car underbody inspection robot according to claim 1, wherein the car underbody inspection robot further comprises a tread inspection camera disposed on both sides of the robot body and selectively protruding to a side of the robot body to photograph a tread surface of the car to be inspected.

3. A car performance inspection system comprising;

a car underbody inspection robot that is inserted into a space below the car to be inspected and takes overlapping images of subject areas for the underbody of the car;

an inspection robot linked module that receives and processes image data taken by the car underbody inspection robot to generate one matching image photo of the underbody of the car to be inspected; and a car performance evaluation module that performs performance evaluation based on the matching image generated by the inspection robot linked module and outputs the evaluation results so that they can be checked online, wherein the car underbody inspection robot comprises a robot body having a traveling means comprising wheels or caterpillars and a drive motor that provides rotational force to the traveling means, wherein the robot body comprises;

a master unit connected to the traveling means and the drive motor of one side of the robot body with respect to a center of the robot body;

a slave unit connected to the traveling means and the drive motor of the other side of the robot body with respect to the center of the robot body; and an extension unit that can be interposed between the master unit and the slave unit, wherein inspection cameras are installed in each of the master unit, the slave unit, and the expansion unit, and a width of the robot body is determined by a number of expansion units used.

* * * * *